United States Patent [19]
Turner et al.

[11] Patent Number: 5,914,780
[45] Date of Patent: Jun. 22, 1999

[54] DIGITISATION OF INTERFEROGRAMS IN FOURIER TRANSFORM SPECTROSCOPY

[75] Inventors: Andrew Turner, Great Missenden; Robert A. Hoult, Beaconsfield; Michael D. Forster, High Wycombe, all of United Kingdom

[73] Assignee: Perkin-Elmer Ltd., Beaconsfield, United Kingdom

[21] Appl. No.: 08/946,779

[22] Filed: Oct. 8, 1997

[30] Foreign Application Priority Data

Oct. 9, 1996 [EP] European Pat. Off. .............. 96307360

[51] Int. Cl.$^6$ ....................................................... G01B 9/02
[52] U.S. Cl. ............................ 356/346; 356/345; 356/349
[58] Field of Search ...................... 356/346, 349, 356/358, 345

[56] References Cited

U.S. PATENT DOCUMENTS

| 4,511,986 | 4/1985 | Bellar et al. ............................ 364/576 |
| 5,838,438 | 11/1998 | Peale et al. .............................. 356/346 |

OTHER PUBLICATIONS

Applied Optics, vol. 35, No. 16, Jun. 1, 1996, pp. 2891–2896, XP000594917, Brault J.W.: "New approach to high-precision Fourier transform spectrometer design".

Applied Optics, vol. 32, No. 25, Sep. 1, 1993, pp. 4822–4827, XP000195635 Minami K. and KawataS.: "Dynamics range enhancement of Fourier transform infrared spectrum measurement using delta sigma modulation".

Proceedings of IEEE, vol. 69, No. 3, Mar. 3, 1981, pp. 300–331, XP000195636 Crochiere R. E. and Rabiner L.R.: "Interpolation and decimation of digital signals—a tutorial review".

*Primary Examiner*—Robert H. Kim
*Assistant Examiner*—Andrew H. Lee
*Attorney, Agent, or Firm*—David Aker

[57] ABSTRACT

Interferograms produced by a Michelson type interferometer used in Fourier Transform spectroscopy are processed by an arrangement which includes an analogue-to-digital converter (12) which is sampled by a fixed frequency clock signal to provide a digital representation of the interferogram. This signal is processed by a digital data processor (18) which also receives a digital representation of the reference fringe waveform to provide a digital output representing the interferogram. The digital representation of the reference fringe waveform may be produced by a second analogue-to-digital converter or by a timer. The analogue-to-digital converter may be arranged to produce over-sampled representations of the interferogram or reference fringe waveforms. In one form of the invention the analogue-to-digital converter or converters include a delta sigma modulator.

26 Claims, 7 Drawing Sheets

DIGITISATION OF INTERFEROGRAMS IN FOURIER TRANSFORM SPECTROSCOPY

TECHNICAL FIELD

This invention relates to infrared spectroscopy and in particular relates to FT-IR spectroscopy based upon a Michelson type interferometer.

BACKGROUND ART

In an FT-IR spectrometer, an interferometer of the Michelson type splits an input light beam into a reflected beam and a transmitted beam by means of a beam splitter. Each split beam travels along its own path to a return mirror which deflects it back to the beam splitter along the same path. One of the return mirrors is stationary whilst the other is movable, typically along a linear path between two limits equidistant from a datum position. At the beam splitter the return split beams recombine along a common output path leading to a photodetector via a sample station.

If the movable mirror is at its datum position the optical path of the two split beams is the same so that when those split beams return to the beam splitter, they constructively interfere. This results in a large signal being produced at the photodetector and this is known as the center burst.

If the movable mirror is shifted towards the incoming split beam, the optical path of that beam decreases and conversely if it is moved away, the optical path is increased. Thus, as the movable mirror is moved from one limit to another, two complete series of optical path difference values of opposite signs are generated and this travel is referred to as an OPD scan. The output signal of the photodetector during an OPD scan is a series of superimposed electrical sine waves of different frequencies and amplitudes. This signal is known as an interferogram.

Such interferometers include a reference light source, typically a laser, which is used to measure the optical path difference. The reference fringes created during an OPD scan are sensed by a photodetector which generates a reference fringe signal which is a sine wave.

When no sample is present at the sampled position, the detector signal is the emission interferogram of the light source, typically an infrared source. When a sample is present, the output signal of the detector is the interferogram of the sample superimposed upon that of the light source. By taking the Fourier transform of the source interferogram and the Fourier transform of the sample interferogram superimposed upon that of the source, it is possible to obtain the spectrum of the sample.

SUMMARY OF THE INVENTION

The present invention is concerned with the acquisition and processing of interferograms in order to obtain such spectra. It is known in the processing of interferograms to feed the output of the photodetector to an analogue-to-digital converter in order to produce a digital representation of the interferogram. Timing signals for sampling the interferogram are typically derived from the zero crossing points of the reference fringes of the laser used in the interferometer. In one known arrangement the analogue-to-digital converter is a successive approximation type analogue-to-digital converter with a sample and hold arrangement, which is sampled at each reference fringe zero crossing point. A problem with the successive approximation type analogue-to-digital converter is their relatively poor signal-to-noise ratio.

An alternative arrangement is described in an article by Minami and Kawata, published in Applied Optics, Vol. 32, No. 25, September 1993, pages 4822 to 4826. This article describes a proposal for using an over sampling technique by digitizing the interferogram using a delta sigma ($\Delta\Sigma$) modulation technique. The arrangement makes use of a phase locked loop to generate over sampling pulses at a frequency which is a multiple of the reference fringe frequency, such that the output rate of the analogue-to-digital converter matches the reference fringe frequency. This arrangement suffers from the disadvantage that the characteristics of the phase locked loop can lead to inaccuracies in sampling.

The present invention is concerned with a technique for processing an interferogram which uses an analogue-to-digital converter such as a delta sigma ($\Delta\Sigma$) modulator oversampled at a fixed clock rate.

Thus, according to the present invention there is provided apparatus for processing the output signals of a Michelson type interferometer used in Fourier Transform spectroscopy, which outputs include a waveform comprising an interferogram and a waveform representing reference interference fringes, said apparatus comprising an analogue-to-digital converter for providing a digital representation of the interferogram waveform, means for providing a fixed frequency clock signal to said analogue-to-digital converter and processing means arranged to receive the digital representation of the interferogram waveform and a digital representation of the reference fringe waveform and to process said inputs to provide a digital output representing the interferogram.

The waveform representing the reference fringes may be applied to an input of a second, fixed frequency analogue-to-digital converter, thus providing a digitized representation of the reference fringe waveform.

The sampling signals for the analogue-to-digital converters may be provided by one or more high speed, fixed frequency, clocks. The frequency of the clock signal supplied to the first analogue-to-digital converter may be different from the frequency of the clock signal applied to the second analogue-to-digital converter.

The processing means may be arranged to determine the time at which each reference fringe is at a predetermined datum point, to filter and interpolate the interferogram values from the analogue-to-digital converter, to generate mathematical functions representing interferogram values at points intermediate to the sampling points, and to reconstruct the interferogram at the datum points from said functions. The predetermined datum points may be some or all of the zero crossing points of the reference fringes. Alternatively the datum points may be points intermediate the zero crossing points of the reference fringes.

The analogue-to-digital converter is preferably a delta-sigma modulator. In this respect it should be noted that it is common for a delta-sigma modulator to be supplied with an integral digital filter and the combination is usually referred to as a delta sigma converter. It should be appreciated that the present invention in its broadest aspect contemplates the use of delta sigma modulators without the presence of an integral digital filter.

The determination of the predetermined datum points may be carried out by filtering and interpolation of the fringe data.

The interpolation of the interferogram values and the fringe data may be carried out by generating data at additional points at fixed intervals between the sampling points, then fitting a curve to the additional data to define data continuously between the sampling points.

The additional points may be generated using mid-point interpolation.

Alternatively, the additional points may be generated using polyphase filters.

The curve fitting may comprise a linear, cubic or higher order fit.

The digital representation of the reference waveform may be generated by a timer which identifies the datum points of the reference fringes. The datum points may be the zero crossings of the fringes. The output of the timer may be fed through a low pass digital filter. The processing means may be arranged to filter and interpolate the interferogram values from the analogue-to-digital converter, to generate mathematical functions representing interferogram values at points intermediate the sampling points, and to reconstruct the interferogram at the datum points from said functions.

BRIEF DESCRIPTION OF THE DRAWINGS

The invention will be described now by way of example only, with particular reference to the accompanying drawings. In the drawings.

DETAILED DESCRIPTION OF THE PREFERRED EMBODIMENT

Figure 1:
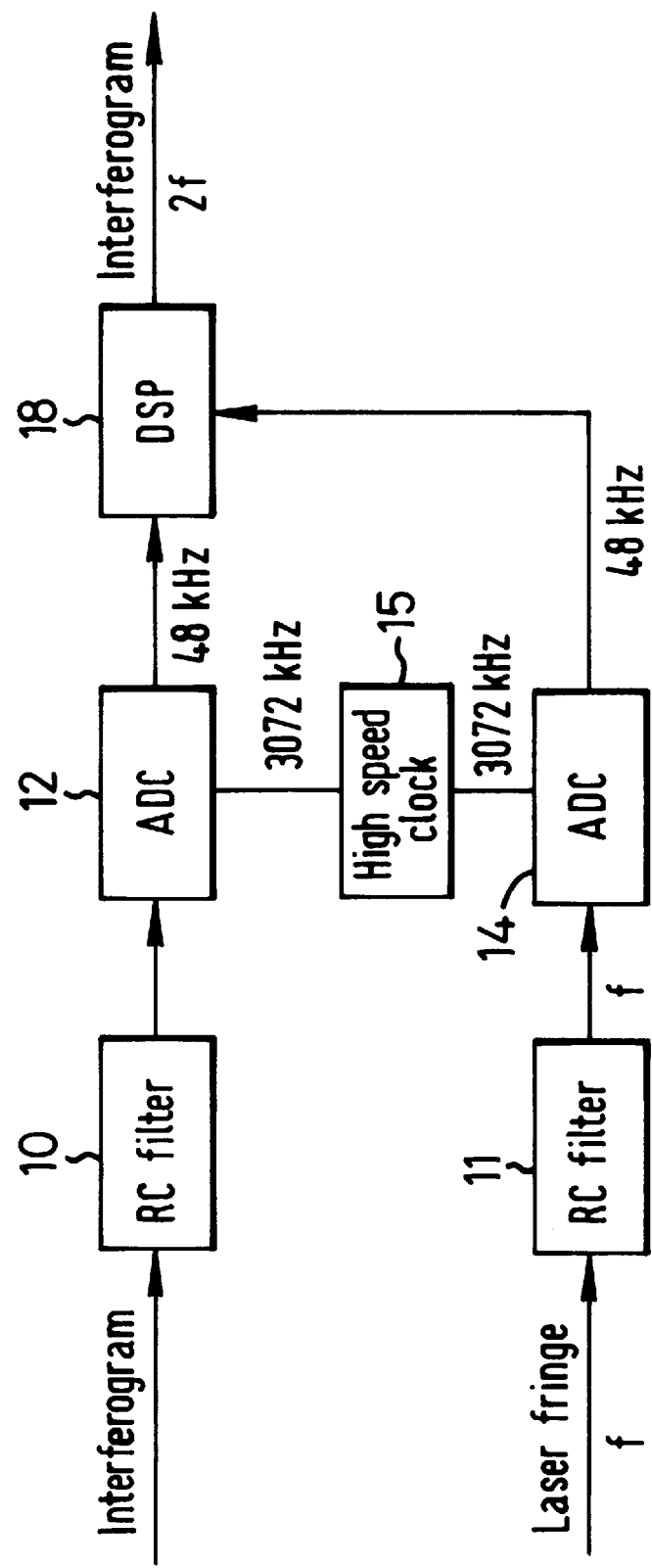
FIGS. 1, 1A and 1B are schematic block diagrams of a first embodiment of apparatus in accordance with the present invention.
Figure 1A:
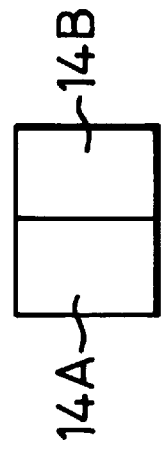
Figure 1B:

Referring to FIG. 1, a first embodiment of apparatus for processing the interferogram signal and reference fringe signal of a Michelson type interferometer includes a first RC (resistance capacitor) filter (10) which receives the interferogram signal and a second RC filter (11) which receives the reference fringe signal. The output of the RC filter (10) is fed to an analogue-to-digital converter (12), which comprises a delta sigma ($\Delta\Sigma$) converter. The delta sigma converter comprises a delta sigma modulator (12A) and a digital filter (12B) as shown in FIG. 1A. The output of the RC filter (11) is fed to a similar delta sigma ($\Delta\Sigma$) converter (14). The delta sigma converter (14) comprises a delta sigma modulator (14A) and a digital filter (14B) as shown in FIG. 1B. A high speed clock (15) provides output signals which are used to provide sampling signals to the delta sigma ($\Delta\Sigma$) converters at the prescribed over sampling rate. It will be noted that this arrangement provides a fixed clock rate for each delta sigma ($\Delta\Sigma$) converter. The output of the converter (12) is a twenty bit low data rate binary signal which is generated by the filter (12B) from the 1 bit clock rate signal from the modulator (12A) and which is passed to a digital signal processor (18), which also receives the output from the converter (14). The output of the digital signal processor (18) is a digitized representation of the interferogram at the zero crossing points of the reference fringes.

A significant feature of the arrangement shown in FIG. 1 is that the interferogram signal is over sampled at a fixed clock rate, i.e. the clock rate of the output of the high speed clock (15). This means that it simplifies the analogue electronics in the interferogram channel. This means that it shifts the processing emphasis to digital data processing within the block (18) as the interferogram has been acquired as a function of time, rather than a function of optical path difference. In order to effect this, knowledge of the reference fringe is required and this can be obtained either from digitisation of the reference fringe or from accurate timing of the zero crossings. In the present embodiment, as shown in FIG. 1, a scheme based upon digitisation of the reference fringe is shown. A later embodiment will illustrate an arrangement based upon timing of the zero crossings.

Digitisation of the reference fringes by the delta sigma ($\Delta\Sigma$) converter (14) provides the processor (18) with additional information to enable the necessary processing to be carried out. In the processing, zero crossing values are reconstructed from the available data by a process of curve fitting which will be described with reference to FIG. 2. The advantage is that the electronics of the system is relatively simple and the delta sigma ($\Delta\Sigma$) converters are being used in circumstances in which they operate at their optimum. It should be noted that whilst FIG. 1 shows the two converters 12 and 14 operating at the same clock frequency, they can be operated at different fixed clock frequencies.

In general terms the digital signal processor (18) operates to reconstruct the interferogram provided by the detector of the interferometer in correspondence to the reference fringe zero crossing values and the method involved comprises two principal phases. In a first phase the time at which each reference fringe zero crossing occurs is determined relative to the times at which samples were taken. In the case of reference fringe digitisation, this involves filtering and interpolation of the reference fringe data from the delta sigma ($\Delta\Sigma$) converter (14), in order to generate a set of mathematical functions which continuously define the reference fringe values between samples. The time of the zero crossings are determined from these functions.

In a commercially available sigma-delta converter, the direct modulator output is usually not made available and the filtered bandwidth and output data rate from the filter are fixed with a data rate close to the minimum which can define the full bandwidth of the output data. This presents problems in accurately interpolating the converter data in order to generate the continuous mathematical functions. One method of generating these functions is to use a process where additional points are generated at fixed intervals within the original sample interval from the converter, these points recreating those which would have been generated by the converter if the digital filter was capable at outputting data at a higher rate. Also, the filter bandwidth is often too large for the application and a subsequent stage of bandpass filtering may be required. This example assumes that such converters with a fixed bandwidth and minimized output data rate are used, and that additional filtering and fixed interval interpolation are required.

The interferogram values from the delta sigma ($\Delta\Sigma$) converter (12) are filtered and interpolated to generate a set of mathematical functions which continuously define the interferogram values between samples. The values of the reconstructed interferograms at the reference fringe crossing times are then calculated using these functions. Thus the interpolation is a two-step process in which first additional points are generated at fixed intervals within the original sample interval (i.e. the data rate is increased) using either mid-point interpolation or polyphase filters. Then a linear or cubic fit is used to define the data continuously between these points.

Figure 2:
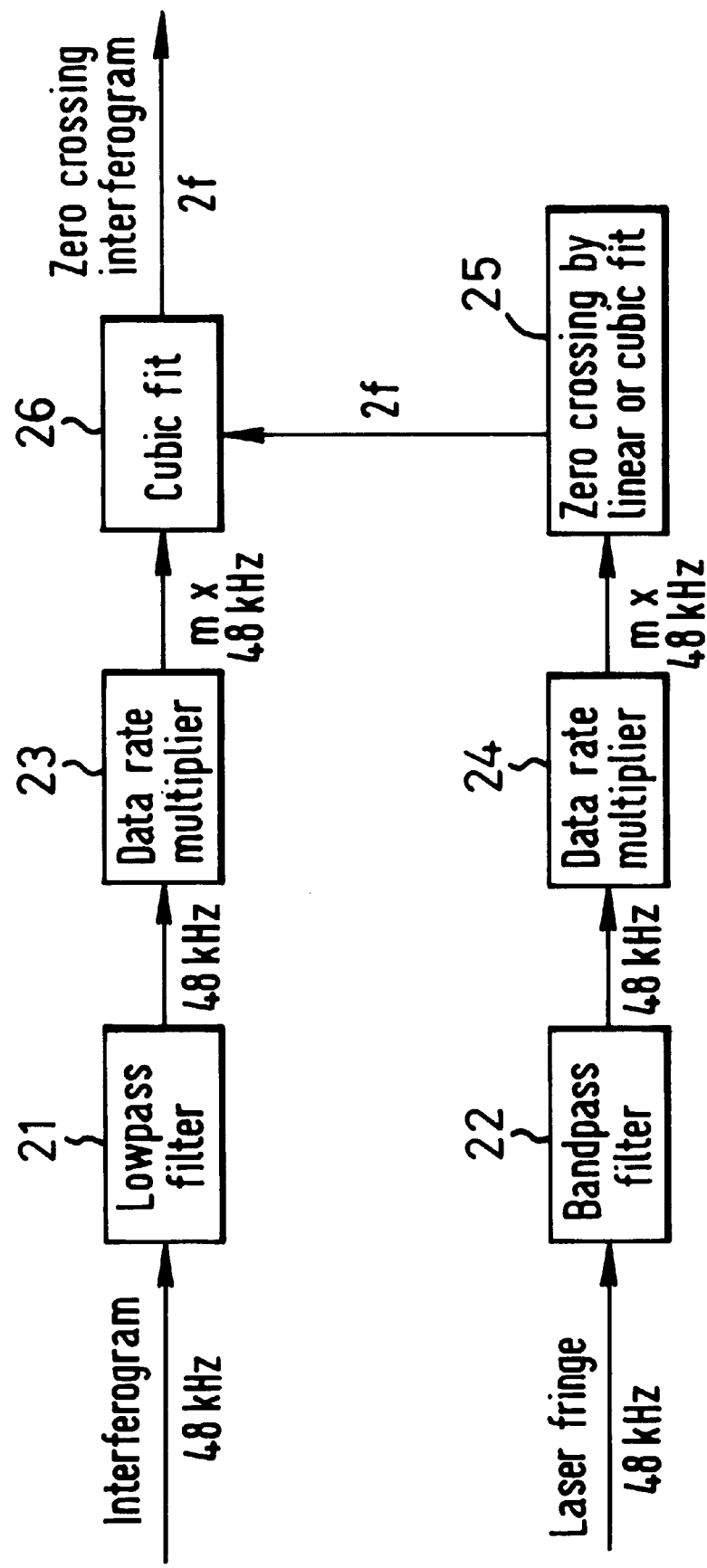
FIGS. 2 and 2A are block diagrams representing the operation of the processing block shown in FIG. 1.

The process is illustrated in FIG. 2 for the scheme illustrated in FIG. 1. In FIG. 2 blocks (21, 22) represent the filtering of the interferogram and reference fringe signals respectively, blocks (23, 24) represent the data rate multiplication, block (25) represents determination of the time of the zero crossings of the reference fringes and block (26) represents the curve fitting of the interferogram to provide a digital representation of the interferogram at the zero crossing points.

The software outline shown in FIG. 2 will now be described in more detail. By way of introduction it is assumed that the ADC's 12 and 14 are constructed by a dual channel delta sigma (ΔΣ) converter which has two analogue inputs and synchronously samples each input (i.e. the interferogram and the reference fringe signal) at a fixed frequency of 48 kHz. The bandwidth of the output of each channel is from 0 to 22 kHz approximately. The output from the dual channel delta sigma (ΔΣ) converter then comprises two streams of data, each being sampled at the same instant with a fixed time interval between the sampling points. The data processor calculates the value of the IR interferogram at each point where the value of the reference fringe sine wave passes through zero. This is carried out as a two-part process. Initially by interpolation of the reference fringe data the time of the zero crossing is determined relative to the points in the data stream. This time is then used in interpolation of the IR interferogram data to give the required zero crossing interferogram value. The assembled interferogram based on the zero crossing values can then be Fourier transformed in a conventional manner in order to generate a single beam spectrum.

Two different implementations of processing will now be described. One is based upon mid-point interpolation and the other on polyphase filters. In each case the processing of the IR signal and the reference fringe signal is matched in order to maintain time synchronisation between the channels. The example to be given is for a scan OPD velocity of 0.2 cm per second, where the nominal fringe frequency is assumed to be 3 kHz and the IR signal bandwidth 0 to 2 kHz. As has been mentioned the data from each channel is filtered in order to reduce noise and avoid aliasing.

In an implementation based on mid-point interpolation the reference fringe data is passed through the digital band pass filter (22) which is an FIR type with approximately 50 taps. The pass band is 1 to 5 kHz. The characteristics of this filter determine the number of taps to be used for both filters. The IR data is passed through the digital low pass filter 21 which has the same number of taps as the reference fringe filter 22 and has a bandwidth of 0 to 2 kHz. In the next step intermediate points in the reference fringe data are generated by use of a mid-point interpolation function. This process may have to be repeated until the data is adequately over sampled.

Intermediate points in the IR data are generated by use of a mid-point interpolation function in order to generate data at the same over sampled rate as for the reference fringe data. This facilitates data processing. The next step is to fit a continuous function, which may be linear or cubic to the interpolated reference fringe points either side of a zero crossing. It is then possible to determine the time at which the fitted function is equal to zero.

Also a continuous function, which may be cubic or higher order, is fitted to the interpolated IR data over the same interval as that contained in the reference fringe zero crossing and the value of the function at the calculated zero crossing time is determined. This then gives the zero crossing interferogram value at the output of block (26) shown in FIG. 2.

Figure 5:
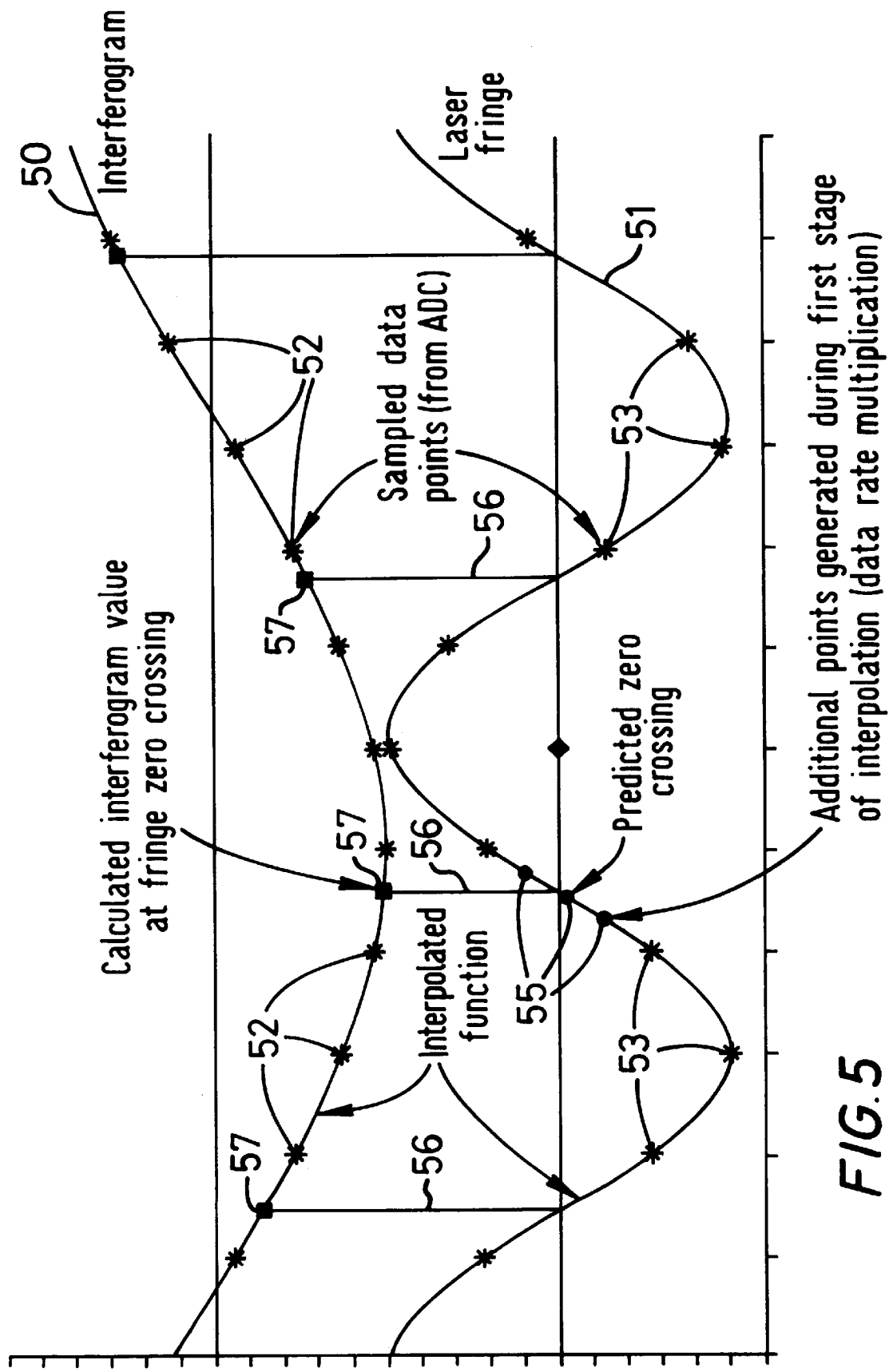
FIG. 5 is a waveform diagram illustrating the operation of the present apparatus.

The process is illustrated graphically in FIG. 5 of the drawings. In this Figure curve (50) represents the interferogram waveform from the detector and curve (51) represents the reference fringe waveform.

The data obtained at the sampling points of the delta sigma (ΔΣ) converter are identified by reference numeral (52) for the interferogram and reference numeral (53) for the reference fringe waveform. Reference numeral (55) identifies the additional points generated during the first stage of the interpolation (data rate multiplication) and the predicted zero crossing points are shown at (56). The calculated interferogram values at these zero crossing points are shown by reference numeral (57).

As mentioned above, it is possible to achieve a similar result using an implementation based upon polyphase filters. Polyphase filters are a set of FIR digital filters, each of which has a matched frequency response, but a different fractional group delay. A description of polyphase filters can be found in "Interpolation and Decimation of Digital Signals" by R. E. Crochiere and L R. Rabiner, Proc IEEE, Vol 69, No. 3, March 1981, pp 300–330. The approach has the advantage of removing redundant calculations and requiring less data memory in order to operate. It does however require more memory for the storage of filter coefficients. However, mathematically, this implementation and the mid-point interpolation implementation produce substantially identical process data. The steps in the polyphase filter implementation can be summarized as follows:

1) Initially the software predicts where in the data stream the next reference fringe zero crossing will occur. This prediction is based upon the known fringe period and the position of the last zero crossing. The prediction determines the location of the crossing to a fraction of 1/16th of the original sample interval.

2) The appropriate pass band polyphase filters are used to generate interpolated values of the reference fringe, either side of the expected zero crossing position, both points being adjacent 1/16th sub-divisions of the original sample interval. Other points do not need to be calculated.

3) The appropriate low pass (0 to 2 kHz) polyphase filters are used to generate two values of the interpolated IR data on either side of the reference fringe zero crossing position, the four points being adjacent 1/16th sub-divisions of the original sample rate. Other points do not need to be calculated.

4) A continuous function, which may be linear, is fitted to the reference fringe points on either side of the zero crossing. From this the time at which the function is equal to zero is determined.

5) A continuous function which may be cubic is fitted to the IR data over the same interval as that contained in the reference fringe zero crossing and the value of the function at the calculated zero crossing time is determined.

In an implementation based upon polyphase filters it is possible to filter and interpolate in a single step, i.e. to combine the blocks (21) and (23) and the blocks (22) and (24) of FIG. 2. This is illustrated in FIG. 2A.

Figure 2A:
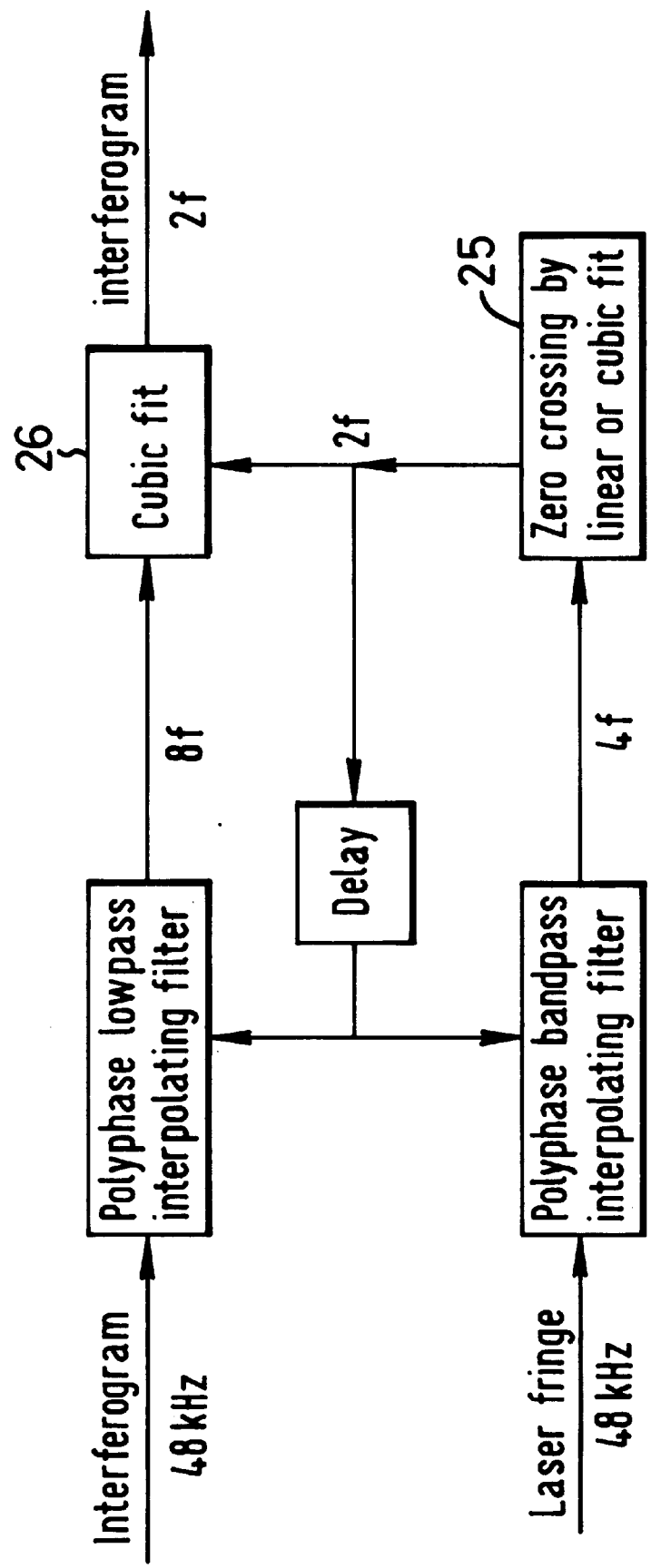

The polyphase filter implementation produces a signal corresponding to the zero crossing interferogram shown at the output of the block (26) in FIG. 2A.

Figure 3:
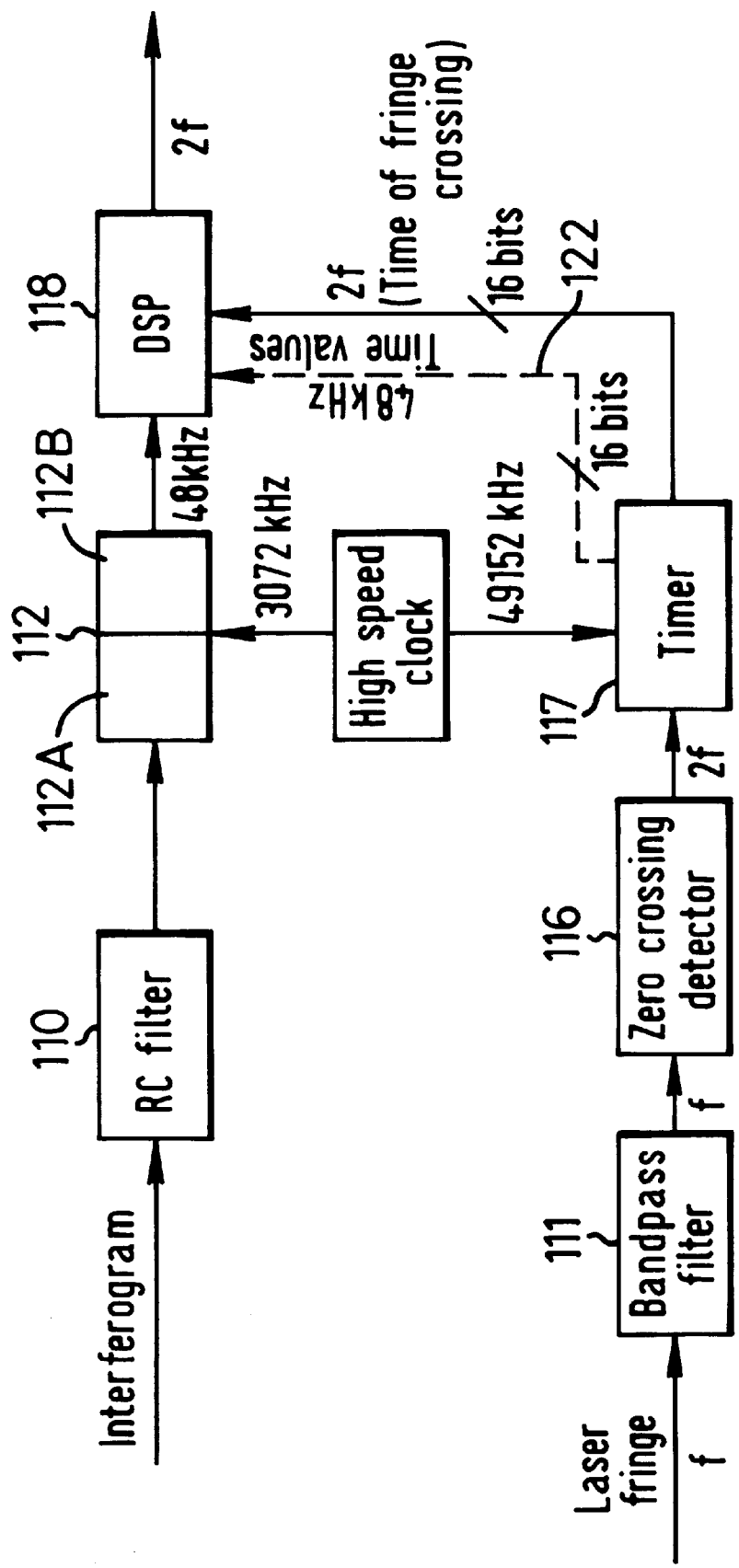
FIG. 3 is a block diagram of a second embodiment of apparatus in accordance with the present invention.

A second embodiment of the present invention will now be described, by example, with reference to FIGS. 3 and 4. FIG. 3 shows in block schematic form an over sampling apparatus based upon reference fringe timing as opposed to reference fringe digitisation. The circuitry for the interferogram signal is similar to that shown in FIG. 1 and comprises an RC filter (110) and a delta sigma (ΔΣ) converter (112) which comprises a ΔΣ modulator (112A) and a digital filter (112B). The output of the converter (112) is connected to a digital signal processing block (118). The reference fringe channel comprises a band pass filter (111), a zero crossing detector (116) and a timer (117). A high speed clock (115) provides sampling signals for the delta sigma (ΔΣ) converter (112) and timing signals for the timer (117). The clock rate of the sampling signal for the delta sigma (ΔΣ) modulator (112) is 3072 kHz and that of the timing signals is 49152 kHz. The timer (117) provides an output representing the time of each reference fringe crossing and this is fed to the digital signal processing block (118). It will be noted in this embodiment that only the IR interferogram signal is sampled by a delta sigma (ΔΣ) modulator. In this arrangement the output is at a constant rate and it is therefore relatively simple to establish the time at which each sample is taken. The time at which the zero crossing points of the reference fringe occur are established by means of the timer (117) and the interferogram value at the reference fringe crossings is reconstructed in the processing circuitry (118) using a similar curve fitting algorithm to that described above. An important factor in the present arrangement is ensuring synchronisation between the ADC data and the reference fringe timer values. One way of achieving this is to feed to the processing block (118) the reference fringe timer value corresponding to each ADC sample. This is illustrated by the line (122) in FIG. 3 which will carry a 16-bit 48 kHz time value signal.

Figure 4:
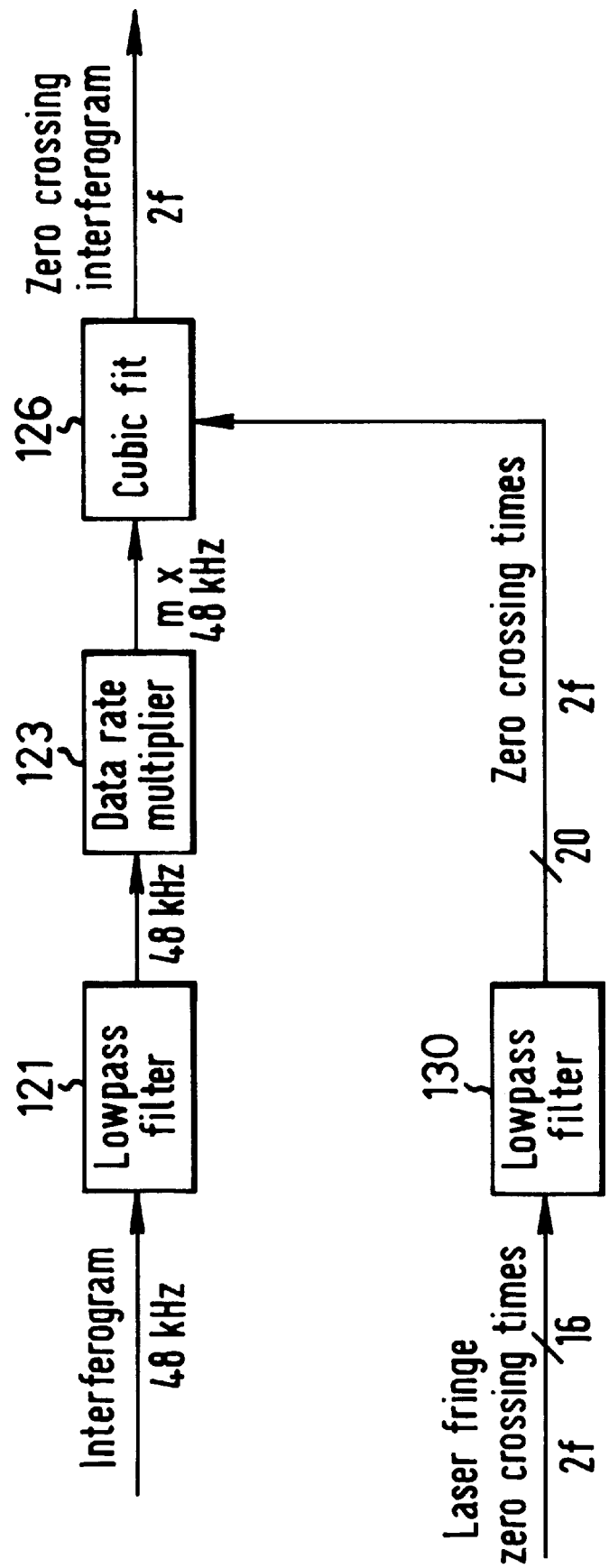
FIGS. 4 and 4A are block diagrams illustrating the operation of the processing block of FIG. 3.
Figure 4A:
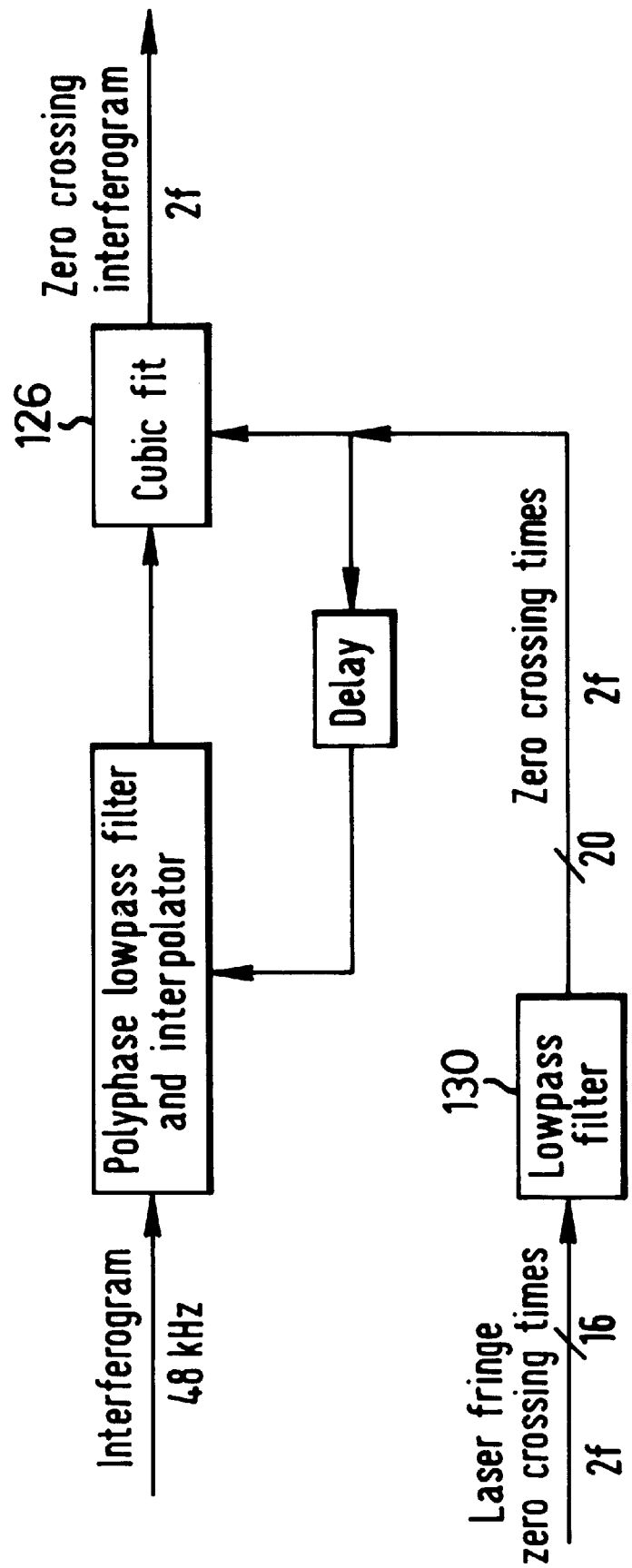

The software structure of the data processor (118) is shown in FIGS. 4 and 4A. The interferogram values are processed in a manner similar to that described with reference to FIGS. 2 and 2A. The processing of the reference fringe data is simplified since the timer (117) provides data representing the zero crossing times. This data is filtered by a low pass filter (130) and then used in the cubic curve fitting block (126).

It will thus be seen that embodiments of the invention operate by oversampling the interferogram waveform at a fixed clock rate using a delta sigma (ΔΣ) converter. The converter output is then processed digitally to reconstruct the interferogram. Thus, the delta sigma (ΔΣ) converter operates at a fixed rate independent of scan velocity. The reconstruction of the interferogram at times corresponding to the zero crossings of the reference fringes is carried out digitally in a high speed digital signal processor using curve fitting algorithms. The reference fringes can be digitized by a delta sigma (ΔΣ) converter.

This type of arrangement has a number of advantages. It is simpler to manufacture and has a minimal analogue content. It has improved signal-to-noise ratio, as well as improved linearity and stability. It does not require a phase locked loop. Different scan velocities can be accommodated by software changes rather than by providing additional electronic filters. Digital processing of the interferogram and reference fringe data can lead to improved accuracy.

Typical parameters for the embodiments described above are as follows (for 1 cm/sec scan velocity):

| ADC sampling rate | 3072 kHz |
|---|---|
| ADC filtered output rate | 48 kHz |
| Required data rate | 400 kHz |

For a 0.2 cm/sec scan velocity the figures are:

| ADC sampling rate | 3072 kHz |
|---|---|
| ADC filtered rate | 48 kHz |
| Required data rate | 80 kHz. |

As has been indicated earlier most commercially available delta sigma converters have a digital decimating filter which provides a fixed bandwidth and data rate, but does not allow access to the output of the delta sigma modulator. The output data rate from one of these is usually lower than that required in the present implementation whilst the bandwidth is usually greater than that required. This is corrected by the additional filtering and interpolation of data.

It is also envisaged that the analogue-to-digital converter 14 of FIG. 1 which digitises the reference fringes can operate at a different, typically higher, frequency than the analogue-to-digital converter 12 which digitises the interferogram. This arrangement may be desirable at higher scan rates where a greater band width is required.

In the embodiments described an analogue-to-digital converter with a standard filter is used to produce a data rate which is too low and a bandwidth which is too great. This is corrected by the subsequent filtering and interpolation stage.

Alternative configurations are possible as follows:

(1) An analogue-to-digital converter including a standard filter which produces data a suitable rate, but too high a bandwidth. In this case, additional filtering is required, but no additional interpolation. For example, this could be used with a 0.05 cm/sec scan velocity interferogram.

(2) An analogue-to-digital converter with a suitable bandwidth, but too low a data rate. In this case additional fixed point interpolation is required, but no filtering. For example this could be used with a 2.0 cm/sec scan velocity interferogram.

(3) A delta sigma modulator (usually 1 bit) together with an external digital filter operating to produce decimated data at a suitable rate and bandwidth. The filter could be electronic or could be implemented in software running on the digital signal processor, or a combination of the two.

These alternative configurations make it possible to implement systems in which one or more of the blocks 12B, 21, 23, or 123 and blocks 14B, 22, or 24, described above can be omitted.

We claim:

1. Apparatus for processing the output signals of a Michelson type interferometer used in Fourier Transform spectroscopy, which outputs include a waveform comprising an interferogram and a waveform representing reference interference fringes, said apparatus comprising an analogue-to-digital converter for providing a digital representation of the interferogram waveform, means for providing a fixed frequency clock signal to said analogue-to-digital converter and processing means arranged to receive the digital representation of the interferogram waveform and a digital representation of the reference fringe waveform and to process said inputs to provide a digital output representing the interferogram, wherein the waveform representing the reference fringes is applied to an input of a second fixed frequency analogue-to-digital converter to produce the digital representation of said waveform.

2. Apparatus according to claim 1, wherein the sampling signals for the analogue-to-digital converters are provided by one or more high speed, fixed frequency clocks to thereby generate an oversampled representation of either or both of the interferogram and the reference fringes.

3. Apparatus according to claim 1, wherein the frequency of the clock signal supplied to the first analogue-to-digital converter is different from the frequency of the clock signal applied to the second analogue-to-digital converter.

4. Apparatus according to claim 1, wherein said processing means is arranged to determine the time at which each reference fringe is at a predetermined datum point, to filter and interpolate the interferogram values from the analogue-to-digital converter, to generate mathematical functions representing interferogram values at points intermediate the sampling points, and to reconstruct the interferogram at the datum points from said functions.

5. Apparatus according to claim 4, wherein the predetermined datum points are some or all of the zero crossing points the reference fringes.

6. Apparatus according to claim 1, wherein either or both of the analogue-to-digital converter includes a delta sigma modulator.

7. Apparatus according to claim 4, wherein the determination of the predetermined datum points is carried out by filtering and interpolation of the fringe data.

8. Apparatus according to claim 7, wherein the interpolation of the interferogram values and the fringe data is carried out by generating data at additional points at fixed intervals between the sampling points, then fitting a curve to the additional data to define data continuously between the sampling points.

9. Apparatus according to claim 8, wherein the additional points are generated using mid-point interpolation.

10. Apparatus according to claim 8, wherein the additional points are generated using polyphase filters.

11. Apparatus according to claim 8, wherein the curve fitting comprises a linear cubic or higher order fit.

12. Apparatus as in claim 1 wherein said reference interference fringes are laser fringes.

13. Apparatus as in claim 1 wherein said outputs include a single waveform comprising an interferogram and a single waveform representing laser reference interference fringes.

14. Apparatus as in claim 2 wherein said one or more high speed, fixed frequency clock signals are provided by a single source.

15. Apparatus for processing the output signals of a Michelson type interferometer used in Fourier Transform spectroscopy, which outputs include a waveform comprising an interferogram and a waveform representing reference interference fringes, said apparatus comprising an analogue-to-digital converter for providing a digital representation of the interferogram waveform, means for providing a fixed frequency clock signal to said analogue-to-digital converter and processing means arranged to receive the digital representation of the interferogram waveform and a digital representation of the reference fringe waveform and to process said inputs to provide a digital output representing the interferogram, wherein the digital representation of the reference waveform is generated by a timer which identifies datum points of the fringes, and wherein the output of the timer is fed through a low pass digital filter.

16. Apparatus according to claim 15, wherein the datum points are the zero crossings of the fringes.

17. Apparatus according to claim 15, wherein said processing means is arranged to filter and interpolate the interferogram values from the analogue-to-digital converter, to generate mathematical functions representing interferogram values at points intermediate the sampling points, and to reconstruct the interferogram at the datum points from said functions.

18. Apparatus according to claim 15, wherein the analogue-to-digital converter includes a delta sigma modulator.

19. Apparatus according to claim 17, wherein the interpolation of the interferogram values is carried out by generating data at additional points at fixed intervals between the sampling points, then fitting a curve to the additional data to define data continuously between the sampling points.

20. Apparatus according to claim 19, wherein the additional points are generated using mid-point interpolation.

21. Apparatus according to claim 19, wherein the additional points are generated using polyphase filters.

22. Apparatus according to claim 19, wherein the curve fitting comprises a linear cubic or higher order fit.

23. Apparatus as in claim 15 wherein said timer is controlled a fixed frequency clock signal.

24. Apparatus as in claim 23 wherein the frequency of said fixed frequency clock signal applied to said analogue-to-digital converter is different from the frequency of said fixed frequency clock signal controlling said timer.

25. Apparatus as in claim 15 wherein said reference interference fringes are laser fringes.

26. Apparatus as in claim 15 wherein said outputs include a single waveform comprising an interferogram and a single waveform representing laser reference interference fringes.

* * * * *